3,828,100
CYCLOALIPHATIC POLYTHIOLS
Richard A. Hickner and Edward W. Goss, Midland, Mich., assignors to The Dow Chemical Company, Midland, Mich.
No Drawing. Filed Apr. 18, 1972, Ser. No. 245,185
Int. Cl. C07c 149/26
U.S. Cl. 260—609 D           4 Claims

ABSTRACT OF THE DISCLOSURE

Exemplary of the cycloaliphatic polythiols of this invention is the compound

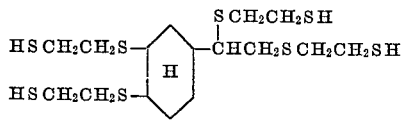

The polythiols are useful in curing polyepoxide resins.

Background of the Invention

It is an object of this invention to provide a novel class of polythiols. Polyepoxides containing the polythiols have been found especially useful in bonding fiberglass reinforced plastics to similar surfaces and to metallic surfaces without the need for extensive cleaning and mechanical preparation of the surface.

Aliphatic, polyoxyalkylene and aromatic polythiols are known but few cycloaliphatic polythiols have been described in the literature. U.S. 3,291,776 describes various polythiols which in combinations with certain sulfides are employed to cure epoxy resins. Also, typical mercaptans and polysulfides prepared therefrom are described in U.S. 2,831,896.

Summary of the Invention

Cycloaliphatic polythiols according to this invention have the formula

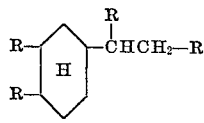

where each R may be —Cl, —Br, —SR$_1$SH or

—OR$_2$SR$_1$SH provided that at least two of said R groups have a terminal thiol group, where R$_1$ may be an alkylene group of 2 to 10 carbon atoms or an alkylene group of 2 to 10 carbon atoms having one or more —O— or —S— ether groups and where R$_2$ is an alkylene group of 2 to 4 carbon atoms. The invention also contemplates polyepoxide resin compositions containing said polythiols.

Description of the Invention

The cycloaliphatic polythiols of this invention may be prepared by reacting a compound of the formula, or isomeric mixtures thereof,

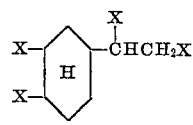

where X may be —Cl, —Br, —OR$_4$Cl or —OR$_4$Br where R$_4$ is an alkylene group of 2 to 4 carbon atoms, with an excess of a dimercaptan in the presence of a base, e.g. NaOH. The above class of compounds is not the subject of this invention but is a separate invention of another inventor.

An excess of the dimercaptan reactant is preferred in order to minimize the preparation of higher condensation products along with the desired cycloaliphatic polythiols. The reaction may be run using one mole of dimercaptan per chloride equivalent, but a 100 to 500 percent excess is preferred.

The preparation of the polythiols is shown by the following typical reactions:

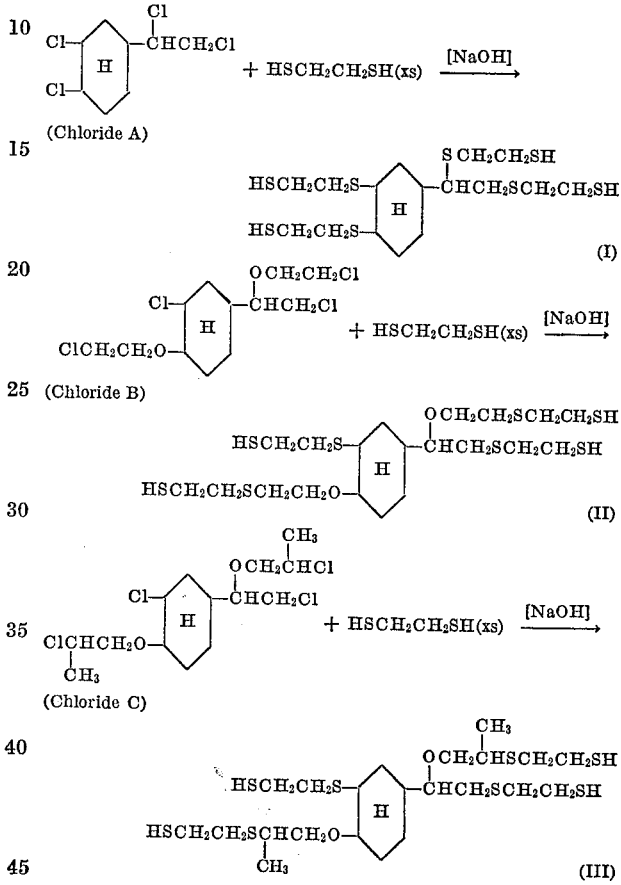

Example 1

In a 3 neck flask was placed a mixture of 564 gms. (6 moles) of 1,2-ethanedithiol, 200 ml. of isopropyl alcohol and 120 gms. (3 moles) of NaOH. The mixture was heated to reflux and 178 gms. (3 chloride equivalents) of Chloride A above was added dropwise over a 1 hour period and refluxed for an additional 20 hours. Water was then added to dissolve the sodium chloride and the solution neutralized with HCl. Two liquid layers formed. The lower layer was separated to recover the polythiol and heated at 110° C. at 0.1 mm. in a flash still to remove excess ethanedithiol. The polythiol product weighed 428 gms. had a Gardner viscosity of A–2, had a thiol (—SH) equivalent weight of 128, contained 49.4% total sulfur and had a residual chlorine content of 8.4%. (The theoretical thiol equivalent weight for the tetrathiol is 120).

Example 2

In a manner similar to example 1 a tetrathiol was prepared from Chloride B (an isomeric mixture) according to reaction II employing 122 gms. (1.5 chloride equivalents) of chloride B, 282 gms. (3 moles) of 1,2-ethanedithiol, 60 gms. (1.5 moles) of NaOH and 100 ml. of isopropyl alcohol. Water was added after the reaction was completed and neutralized as before and the recovered tetrathiol product was heated under vacuum to remove excess ethanedithiol. The light yellow product weighed 291 gms., had a Gardner viscosity of A, had a thiol equivalent weight of 135 and had a residual chlorine content of 5.7%.

Example 3

Chloride C was reacted similarly by refluxing 268 gms. (3 chloride equivalents) of Chloride C with 504 gms. (6 moles) of ethanedithiol, 120 gms. (3 moles) of NaOH and 200 mls. isopropyl alcohol. The reaction was run at reflux for an additional 16 hours before recovering the product and removing excess ethanedithiol as before. The product had a thiol equivalent weight of 148, a Gardner viscosity of A–1, a total sulfur content of 39.0% and a residual chlorine content of 9.34%.

Any of the starting compounds (Chloride A, B or C) may be replaced by equivalent compounds having Br atoms in place of the Cl atoms. It is to be understood that isomeric mixtures of the chloride or bromide starting compounds may be used. Lkiewise 1,2-ethanedithiol may be replaced by alkylenedithiols having up to 10 carbon atoms or alkylene dithiols having up to 10 carbon atoms and one or more —O— or —S— groups. Typical of such dithiols are the following.

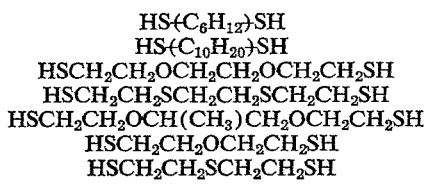

Mixtures of dithiols may also be used in the above reactions.

The starting compounds, i.e. Chloride A, B, and C, etc., are prepared by the addition of chlorine (or bromine) to 4-vinyl cyclohexene or by the simultaneous addition of an alkylene oxide such as ethylene oxide or propylene oxide and chlorine (or bromine). A typical preparation of Chloride A involved placing 324 gms. (3 moles) of 4 vinyl cyclohexene in a resin pot and cooling to about 0–2° C. Chlorine was then added by means of a sparger with stirring and cooling by ice water. After 8.5 hours a total of 515 gms. (7.25 moles) of chlorine had been added. The product was then devolatilized to remove excess chlorine. A product analagous to Chloride C was prepared by sparging chlorine through a mixture of 162 gms. of 4-vinyl cyclohexene and 348 gms. of propylene oxide. A total of 247 gms. of chlorine was added by sparging. After devolatilization about 520 gms. of product was obtained.

The cycloaliphatic polythiols of this invention are fluid, light liquids which may be converted into useful polysulfide polymers by known techniques such as oxidation (see U.S. 2,831,896). More importantly however said polythiols in combination with polyepoxide resins are advantageously used in bonding glass reinforced plastics to similar surfaces or to wood or metal without the need for extensive surface preparation. The problem is most acute with glass reinforced plastics such as unsaturated polyester resins where frequently extensive sanding or shot blasting of the surface is needed in order to get a good adhesive bond. All that is needed with the epoxide compositions herein is a simple solvent wipe of the surface. Strength sufficient for handling parts can be developed at room temperature, but a short elevated temperature treatment at 250° F. is beneficial.

Any polyepoxide resin may be used in which the polyepoxide molecule has more than one epoxide group per molecule. A tertiary amine catalyst in combination with the polythiol and the polyepoxide comprises the adhesive composition. Preferably an inert filler such as a kaolin clay, $CaCO_3$ and the like is present. Also, preferably, a small amount of an auxiliary curing agent such as a polyamide, polyamine, etc. which have functional groups reactive with epoxide groups may be present.

Polyepoxide resins of many diverse types are well known as evidenced by U.S. 2,935,488 and numerous other patents. Especially preferred are the glycidyl polyethers of polyhydric phenols and polyhydric alcohols. These glycidyl ethers are prepared by reacting epichlorohydrin with said phenol or alcohol in the presence of an alkali. Polyhydric phenols include both the mononuclear and polynuclear phenols such as resorcinol, catechol, hydroquinone and the like; and bisphenol A, polyhydric phenolic-formaldehyde condensation products (novolak resins) and the like. U.S. 2,935,488 is incorporated by reference herein to the extent necessary to show the state of the art. Particularly preferred are the glycidyl polyethers of polyhydric phenols such as bisphenol A and novolac resins.

A catalytic amount of a basic catalyst, usually about 0.5 to 5 parts per hundred parts of resin (PHR) may be used. Typical catalysts include tertiary amines such as tetramethyl guanidine, benzyl dimethyl amine, dimethyl aminomethyl phenol, dicyandiamide, and the like; quaternary ammonium hydroxides such as benzyltrimethyl ammonium hydroxide or alkali metal hydroxides such as sodium hydroxide.

The proportions of said polythiol may be varied over a wide range. Good fast cures are obtained by combining about 0.5 to 1.3 equivalents of the polythiol per equivalent of epoxide.

Preferably a small amount, about 0.05 to 0.50 equivalents of an auxiliary curing agent may be used. By auxiliary curing agent is meant herein to include other known curing agents different from the cycloaliphatic polythiols of this invention which have groups reactive with epoxide groups. Typical of such curing agents are polyamines such as ethylene diamine, diethylene triamine, triethylene tetramine and the like, and amidopolyamines (commonly called "amides" by the trade) which are condensation products of dicarboxylic acids and polyamines. The dicarboxylic acids, are, generally, mixtures of dimerized and trimerized fatty acids. A full disclosure of these well known curing agents can be found in "Handbook of Epoxy Resins" by Lee and Neville, McGraw-Hill, 1967, as well as a full description of polyepoxide resins of all types. Further detail as to polyepoxide resins, catalysts, other curing agents and fillers are not considered necessary herein.

Example 4

Several tests were made with compositions containing (1) a cycloaliphatic polythiol, (2) an equivalent amount of a glycidyl polyether of bisphenol A having an epoxide equivalent weight (EEW) of 186–192, 2 PHR of benzyl dimethylamine, and an aluminum silicate filler (ASP–400, Englehard). After mixing, the adhesive was applied to a 1 inch square of a 1" x 4" coupon of a Corvette type glass reinforced cured polyester which had been wiped with acetone and mated with a similarly prepared coupon. The joint was clamped with light pressure and placed in a 265° F. oven for five minutes and allowed to stand overnight. Lap shear strength was then measured in an Instron Tester at a pull rate of 1 in./min.

The compositions and results are shown below:

| Test | Polythiol, grams | D.E.R., grams | ASP–400 [1] | Average lap shear (p.s.i.) |
|---|---|---|---|---|
| (a) | From Ex. 1, 6.4 | 9.45 | 30 | 890 |
| (b) | do | 9.45 | 50 | 860 |
| (c) | From Ex. 2, 7.0 | 9.45 | 30 | 1,080 |
| (d) | do | 9.45 | 50 | 1,100 |

[1] Number is weight percent of total formulation.

When a formulation similar to test (d), above, was made with 55% ASP–400 and cured at 350° F. for ½ hour, conditions representative of an automobile assembly plant paint oven, the lap shear strength was 870 p.s.i. with failure occurring in the substrate. When the lap shear test was run at 180° F. the strength fell to 80 p.s.i.

Similar to the above tests a glass reinforced cured vinyl ester resin bonded to steel had a lap shear strength of 940 p.s.i. The vinyl ester resin was a reaction product of methacrylic acid (25.3%) and a mixture of an epoxy novolak (36.6%) having an EEW of 175–182 and a semi-solid bisphenol A based polyepoxide (33.1%) having an EEW of 400–800. The resin was further reacted with maleic anhydride (5%). The percentages refer to the weight proportions of reactants. The completed resin was then diluted with styrene (60:40) to prepare the glass reinforced resin for the tests.

Example 5

A formulation was prepared by mixing 6.3 gms. (0.045 equiv.) of the polythiol of Example 2, 0.12 gm. (0.005 eq.) of triethylene tetramine, 9.45 gms. (0.05 equiv.) of D.E.R. 331, 2 PHR of benzyl dimethylamine and 19.6 gms. of ASP–400. This formulation was tested with Corvette coupons as above. One set was cured at 130° C. for 5 minutes and allowed to stand at room temperature for 2 hours, while a second set was cured at 350° F. for 30 minutes. Lap shear was determined at room temperature and at 180° F.

|  | Lap shear (p.s.i.) at— | |
| --- | --- | --- |
|  | R.T. | 180° F. |
| First set | 870 | 140 |
| Second set | 1,000 | 410 |

Example 6

Two pieces of birch were lapped and joined by an adhesive comprising 14.1 gms. of the polythiol of Example 2, 17.5 gms. of a glycidyl polyether of bisphenol A having an EEW of 172–178 (equivalent amounts of polythiol and polyepoxide) and 0.15 gm. of tetramethyl guanidine. After about 20 minutes attempts to separate the two blocks of birch resulted in wood failure rather than failure of the glue line.

Example 7

Two pieces of glass reinforced polyester were bonded together with an adhesive comprising 1 equiv. of the polythiol of Example 1, 0.4 equiv. of the diepoxide of 4 vinyl-cyclohexene, and 0.6 equiv. of an epoxy novolac having an EEW of 175–182.

If the polyepoxide adhesive will not be used much above room temperature to about 110–120° F., an auxiliary curing agent is not needed, although it may still be beneficial. For higher temperature service it is advantageous to replace about 0.1 to 0.3 equivalents of said polythiol with an auxiliary curing agent in which case post curing is desirable.

What is claimed is:

1. Cycloaliphatic polythiols having the formula

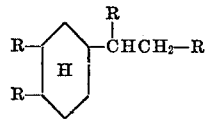

where each R is —Cl, —Br, —SR₁SH or —OR₂SR₁SH provided that at least two of said R groups have a terminal thiol group, where $R_1$ is an alkylene group of 2 to 10 carbon atoms or an alkylene group of 2 to 10 carbon atoms having one or more —O— or —S— ether groups, and where $R_2$ is an alkylene group of 2 to 4 carbon atoms.

2. The polythiol according to Claim 1 having the formula

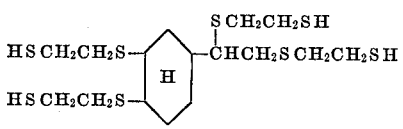

3. The polythiol according to Claim 1 having the formula

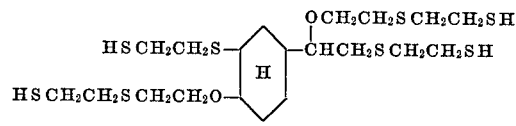

4. The polythiol according to Claim 1 having the formula

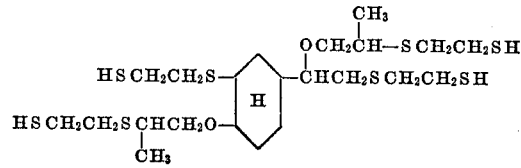

References Cited

UNITED STATES PATENTS 3,707,552 12/1972 Dobinson et al. _____ 260—47
3,624,166 11/1971 Jones et al. _____ 260—609 D LEWIS GOTTS, Primary Examiner D. R. PHILLIPS, Assistant Examiner U.S. Cl. X.R.

260—47 EC